US008911183B2

United States Patent
Okumura

(10) Patent No.: US 8,911,183 B2
(45) Date of Patent: Dec. 16, 2014

(54) CUTTING INSERT FOR DRILL, DRILL, AND METHOD OF CUTTING USING THE SAME

(75) Inventor: Takashi Okumura, Higashiomi (JP)

(73) Assignee: KYOCERA Corporation, Kyoto (JP)

(*) Notice: Subject to any disclaimer, the term of this patent is extended or adjusted under 35 U.S.C. 154(b) by 1095 days.

(21) Appl. No.: 12/918,463

(22) PCT Filed: Feb. 27, 2009

(86) PCT No.: PCT/JP2009/053709
§ 371 (c)(1),
(2), (4) Date: Aug. 19, 2010

(87) PCT Pub. No.: WO2009/107789
PCT Pub. Date: Sep. 3, 2009

(65) Prior Publication Data
US 2010/0329804 A1      Dec. 30, 2010

(30) Foreign Application Priority Data

Feb. 27, 2008  (JP) ................................. 2008-045524

(51) Int. Cl.
*B23B 27/14*        (2006.01)
*B23B 51/04*        (2006.01)

(52) U.S. Cl.
CPC ........... *B23B 51/048* (2013.01); *B23B 2251/50* (2013.01); *B23B 2200/087* (2013.01);
(Continued)

(58) Field of Classification Search
CPC .. B23B 51/02; B23B 51/048; B23B 2200/04; B23B 2200/08; B23B 2200/12; B23B 2200/20; B23B 2200/24; B23B 2200/28; B23B 2205/00; B23B 27/005; B23B 27/14; B23B 27/16; B23B 27/1603; B23B 27/1611; B23B 27/1696; B23C 5/20; B23C 5/207; B23C 5/109; B23D 77/02; B23D 77/025
USPC ........ 408/188, 211, 227, 231; 407/33, 34, 42, 407/53
See application file for complete search history.

(56) References Cited

U.S. PATENT DOCUMENTS 4,776,732 A      10/1988 Hale .............................. 407/114
5,049,011 A *    9/1991 Bohnet et al. ................. 408/223
(Continued)

FOREIGN PATENT DOCUMENTS

EP      0373292 A1    6/1990
EP      1949990 A2    7/2008
(Continued)

OTHER PUBLICATIONS

Chinese language office action dated Aug. 18, 2011 and its English language translation for corresponding Chinese application 200980106298.1.
(Continued)

*Primary Examiner* — John C Hong
*Assistant Examiner* — Christopher M Koehler

(57) ABSTRACT

A cutting insert for a drill of the present invention comprises an upper face having a first side and a second side respectively disposed on both sides of a first corner portion, a bottom face corresponding to the upper face, and a side face located between the upper face and the bottom face. The insert has a first cutting edge formed along the first side, and a second cutting edge formed along the second side. The side face has a first region corresponding to the first cutting edge, a second region corresponding to the second cutting edge, and a third region corresponding to the first corner portion. The third region has an upper region which is adjacent to the first corner portion and disposed toward the upper face, and a lower region located below the upper region. An inclination angle $\theta 3$ of the lower region to the bottom face is larger than each of an inclination angle $\theta 1$ of the first region to the bottom face and an inclination angle $\theta 2$ of the second region to the bottom face. A drill comprising the insert, and a method of cutting using the same are provided.

10 Claims, 8 Drawing Sheets

(52) U.S. Cl.
CPC ....... *B23B 2200/125* (2013.01); *B23B 2205/12* (2013.01); *B23B 27/141* (2013.01); *B23B 2200/08* (2013.01)
USPC ................................ 407/34; 407/53; 408/227

(56) References Cited

U.S. PATENT DOCUMENTS

| | | | |
|---|---|---|---|
| 5,688,083 A * | 11/1997 | Boianjiu | 408/224 |
| 5,718,540 A * | 2/1998 | Satran et al. | 407/42 |
| 5,720,583 A * | 2/1998 | Bohnet et al. | 407/42 |
| 6,039,515 A * | 3/2000 | Lamberg | 408/188 |
| 6,527,486 B2 * | 3/2003 | Wiman et al. | 408/188 |
| 7,905,687 B2 * | 3/2011 | Dufour et al. | 407/42 |
| 8,388,278 B2 * | 3/2013 | Nasu et al. | 408/1 R |
| 2007/0201962 A1 * | 8/2007 | Limell et al. | 408/199 |
| 2007/0280791 A1 * | 12/2007 | Nagaya et al. | 407/42 |
| 2008/0181737 A1 * | 7/2008 | Limell et al. | 408/188 |
| 2009/0129874 A1 * | 5/2009 | Craig | 407/42 |
| 2010/0178122 A1 | 7/2010 | Bae | |
| 2011/0044776 A1 * | 2/2011 | Ishi | 408/1 BD |
| 2011/0250025 A1 * | 10/2011 | Festeau et al. | 407/42 |
| 2012/0003443 A1 * | 1/2012 | Gubanich et al. | 428/206 |

FOREIGN PATENT DOCUMENTS

| | | |
|---|---|---|
| EP | 2167262 | 3/2010 |
| JP | 58-181506 | 10/1983 |
| JP | 02172611 A | 7/1990 |
| JP | 07-251302 | 10/1995 |
| JP | 07-328815 | 12/1995 |
| JP | 09117817 A | 5/1997 |
| JP | 10-029108 | 2/1998 |
| JP | 2003-094222 | 4/2003 |

OTHER PUBLICATIONS

Extended European search report dated Jan. 13, 2011 for corresponding European application No. 09714448.9.

* cited by examiner (a)

(b)

(c)

(a)

(b)

US 8,911,183 B2

CUTTING INSERT FOR DRILL, DRILL, AND METHOD OF CUTTING USING THE SAME

CROSS-REFERENCE TO THE RELATED APPLICATIONS

This application is a national stage of international application No. PCT/JP2009/053709, filed on Feb. 27, 2009, and claims the benefit of priority under 35 USC 119 to Japanese Patent Application No. 2008-045524, the entire contents of which are incorporated herein by reference.

TECHNICAL FIELD

The present invention relates to a cutting insert for a drill and a drill which are used by being attached to a holder, and a method of cutting using the same.

BACKGROUND ART

As a drill for drilling holes, there are for example those in which an inner insert and an outer insert are detachably attached to the tip end of a holder so that their respective rotation loci cross each other. Among others, those in which the inner insert and the outer insert have the same shape are frequently used from the viewpoint of excellent economic performance. That is, the drills in which a plurality of cutting inserts for a drill of similar type (hereinafter referred to as "insert" in some cases) are respectively detachably attached to the inner side and the outer side at the tip end of the holder are frequently used.

The inserts used for this type of drill include an inner cutting edge and an outer cutting edge. The inner cutting edge is the cutting edge for mainly cutting (machining) an inner portion of a bottom face of a hole when it is used as the inner insert. The outer cutting edge is the cutting edge for mainly cutting an outer portion of a bottom face of a hole when it is used as the outer insert.

For example, in the insert described in Japanese Unexamined Patent Application Publication No. 10-29108, the inner cutting edge and the outer cutting edge are formed at the intersection between the upper face and the side face. A clearance angle for avoiding interference with a work material is provided on each of the side faces corresponding to these cutting edges. A corner portion located between both of these cutting edges is formed in a round shape. The same clearance angle as that on the side faces corresponding to these cutting edges is provided on the side face corresponding to the corner portion (refer to FIG. 6(b) in the above publication).

On the other hand, the holder used for this type of drill has, at its tip end, an inner peripheral insert pocket for attaching the inner insert, and an outer peripheral insert pocket for attaching the outer insert (refer to, for example, the above publication).

The outer peripheral insert pocket is openedly formed at the outer periphery of the holder. On the other hand, the inner peripheral insert pocket has a wall face which is located toward the outer periphery of the holder and opposed to the side face of the inner insert. An outer wall exists between the wall face and the outer peripheral face of the holder (refer to FIGS. 2 and 3 of the above publication).

The thickness of the outer wall becomes minimum between the wall face opposed to the side face of the corner portion located on the side not to be involved in cutting in the insert, and the outer peripheral face of the holder. Therefore, there has been the problem that the strength of the portion of the holder where the thickness of the outer wall becomes minimum is deteriorated, and the holder is susceptible to breakage during machining.

Additionally, the outer wall does not exist in the outer peripheral insert pocket formed openedly in the outer periphery, and the portion of the holder where the outer peripheral insert pocket is formed has low strength. Hence, there has also been the problem that the holder is liable to be broken from the portion of the holder during machining.

DISCLOSURE OF THE INVENTION

An object of the present invention is to provide a cutting insert for a drill and a drill which are used by being attached to a holder and capable of reducing breakage of the holder during machining, as well as a method of cutting using the same.

A cutting insert for a drill according to an embodiment of the present invention comprises an upper face having a first corner portion, and a first side and a second side respectively disposed on both sides of the first corner portion, a bottom face corresponding to the upper face; and a side face located between the upper face and the bottom face. The cutting insert for the drill has a first cutting edge formed along the first side, and a second cutting edge formed along the second side. The side face has a first region corresponding to the first cutting edge, a second region corresponding to the second cutting edge, and a third region corresponding to the first corner portion. The third region has an upper region which is adjacent to the first corner portion and disposed toward the upper face, and a lower region located below the upper region. An inclination angle θ3 of the lower region to the bottom face is larger than each of an inclination angle θ1 of the first region to the bottom face and an inclination angle θ2 of the second region to the bottom face.

A cutting insert for a drill according to other embodiment of the present invention comprises an upper face having a substantially square shape when viewed from above, and having a pair of first corner portions located on one diagonal; a first side and a second side respectively disposed on both sides of each of the first corner portions; and a pair of second corner portions which are disposed between the first side and the second side disposed correspondingly to the first corner portions different from each other, and which are located on the other diagonal; a bottom face corresponding to the upper face; and a side face located between the upper face and the bottom face. The cutting insert for the drill has a first cutting edge formed along the first side; and a second cutting edge formed along the second side. The side face has a first region corresponding to the first cutting edge, a second region corresponding to the second cutting edge, a third region corresponding to the first corner portion, and a fourth region corresponding to the second corner portion. Each of the third region and the fourth region has an upper region which is adjacent to the first corner portion and the second corner portion and disposed toward the upper face, and a lower region located below the upper region. Each of an inclination angle θ3 of the lower region in the third region to the bottom face and an inclination angle θ5 of the lower region in the fourth region to the bottom face is larger than each of an inclination angle θ1 of the first region to the bottom face and an inclination angle θ2 of the second region to the bottom face.

A drill according to an embodiment of the present invention comprises a holder comprising a first insert pocket formed at a tip end portion, and a second insert pocket formed at a tip end portion toward the outer periphery than the first insert pocket; and a pair of the cutting insert for a drill each having at least two pieces of the first corner portions. In the drill, one of the paired cutting inserts for the drill is attached to the first insert pocket so that at least a part of the first cutting edge protrudes from the tip end of the holder, and the other is attached to the second insert pocket so that at least a part of the second cutting edge protrudes from the tip end of the holder. At least one of the paired cutting inserts for the drill is attached to the insert pocket so that the first corner portion of the two first corner portions which is located on a side not to be involved in cutting in the cutting insert for the drill is disposed toward the outer periphery of the holder in the insert pocket with the cutting insert for the drill attached thereto, and disposed toward the basal end of the holder.

A drill according to other embodiment of the present invention comprises a holder comprising a first insert pocket formed at a tip end portion, and a second insert pocket formed at a tip end portion toward the outer periphery than the first insert pocket; and a pair of cutting inserts for a drill. Each of the paired cutting inserts for the drill comprises an upper face having at least two corner portions, and a first side and a second side respectively disposed on both sides of each corner portion; a bottom face corresponding to the upper face; a side face located between the upper face and the bottom face; a first cutting edge formed along the first side; and a second cutting edge formed along the second side. The side face has a first region corresponding to the first cutting edge, a second region corresponding to the second cutting edge, and a third region corresponding to the corner portion. The third region has an upper region which is adjacent to the corner portion and disposed toward the upper face, and a lower region located below the upper region. An inclination angle θ3 of the lower region to the bottom face is larger than each of an inclination angle θ1 of the first region to the bottom face and an inclination angle θ2 of the second region to the bottom face. In the drill, at least one of the paired cutting inserts for the drill is attached to the first insert pocket so that at least a part of the first cutting edge protrudes from the tip end of the holder, and the other is attached to the second insert pocket so that at least a part of the second cutting edge protrudes from the tip end of the holder. At least one of the paired cutting inserts for the drill is attached to the insert pocket so that the corner portion of the two corner portions which is located on a side not to be involved in cutting in the cutting insert for the drill is disposed toward the outer periphery of the holder in the insert pocket with the cutting insert for the drill attached thereto, and disposed toward the basal end of the holder.

A holder according to an embodiment of the present invention comprises a first insert pocket formed at a tip end portion, and a second insert pocket formed at a tip end portion toward the outer periphery than the first insert pocket. Each of the first insert pocket and the second insert pocket comprises a constraining seat face contacting against the bottom face of a cutting insert for a drill, and a constraining side face being located toward the outer periphery of the holder and corresponding to a side face of the cutting insert for the drill. At least one of the first insert pocket and the second insert pocket is formed so that a lower part of the constraining side face protrudes inward of the holder.

A method of cutting a work material according to an embodiment of the present invention includes the step of rotating either one of the drill and a work material; the step of bringing the first cutting edge and the second cutting edge of the drill near the work material; the step of cutting the work material by bringing the first cutting edge and the second cutting edge of the drill into contact with the surface of the work material; and the step of separating the first cutting edge and the second cutting edge from the work material.

According to the cutting inserts for the drill and the drills, besides maintaining the strength of the corner portions of the insert, it is capable of increasing the thickness of the outer wall of the holder opposed to the corner portions located on the side not to be involved in the cutting, namely, the thickness of the portion of the holder located toward the outer periphery of the holder in the insert pocket to which the insert is attached, and also located toward the basal end of the holder. Consequently, the strength of the corresponding portion of the holder is enhanced, resulting in improved tool life.

According to the method of cutting the work material, cutting (machining) with excellent machining accuracy can be achieved stably over a long period of time.

BRIEF DESCRIPTION OF THE DRAWINGS

FIG. 6(b) is an enlarged side view showing the neighborhood of a second insert pocket thereof;

PREFERRED EMBODIMENTS FOR CARRYING OUT THE INVENTION

Cutting Insert for Drill

Figure 1:
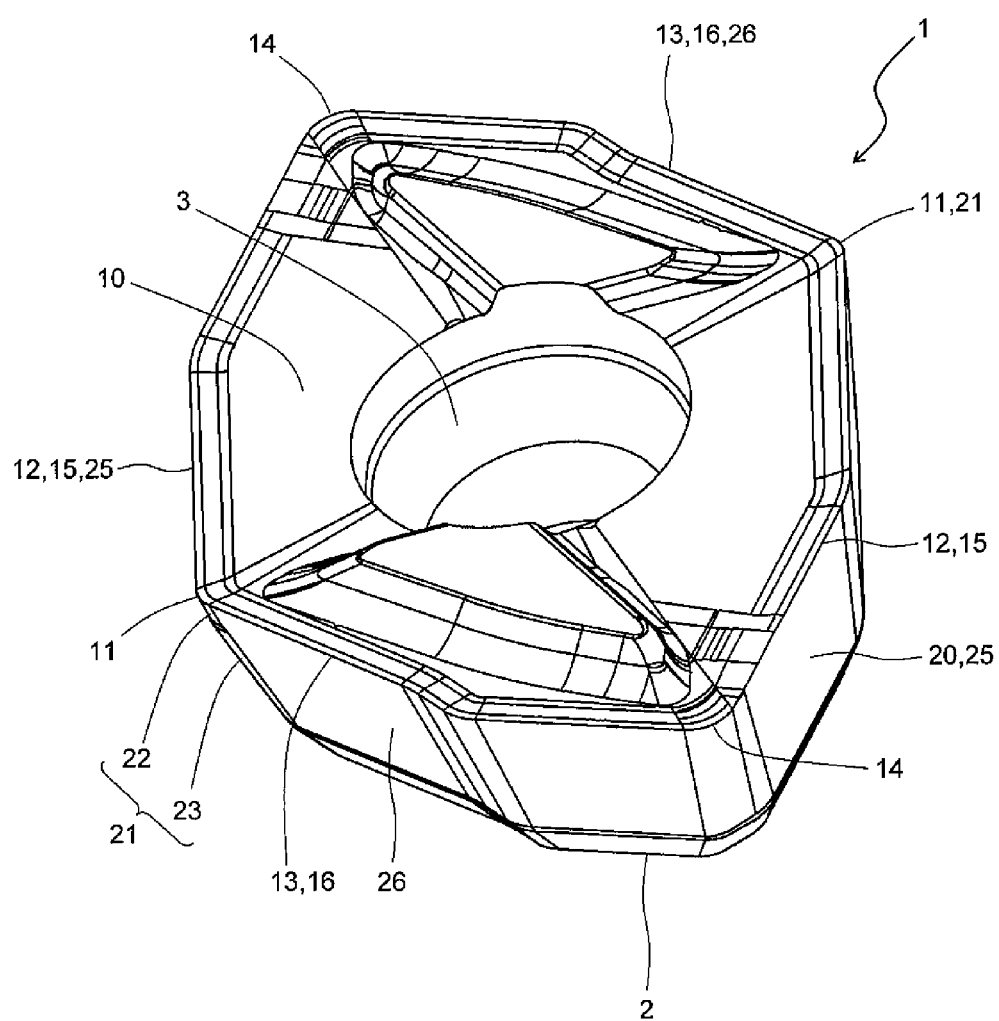
FIG. 1 is an overall perspective view showing a cutting insert for a drill according to an embodiment of the present invention.
Figure 2:
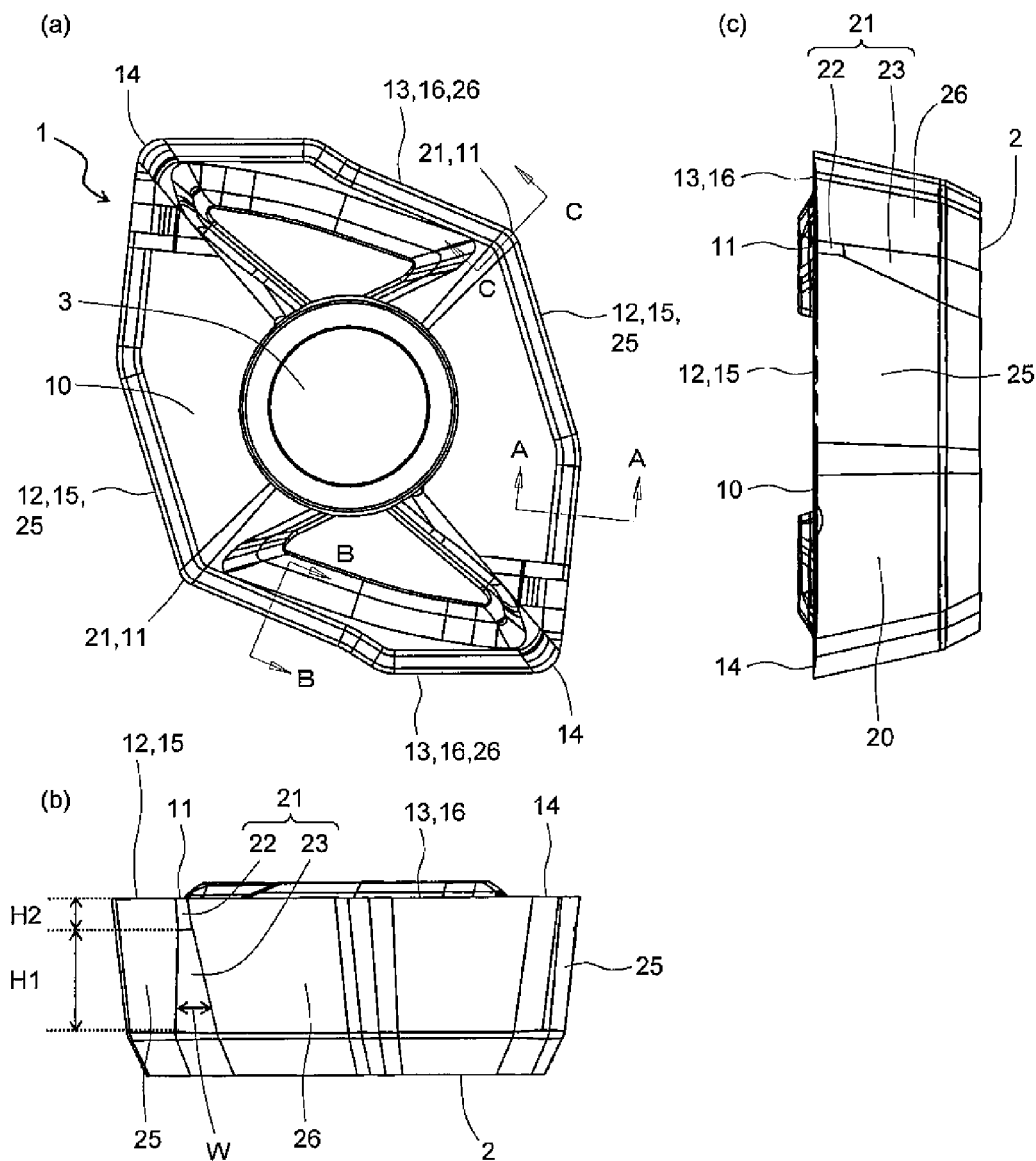
FIG. 2(a) is an upper view showing the cutting insert for the drill shown in FIG. 1.
FIG. 2(b) is a front view thereof.
FIG. 2(c) is a side view thereof.
Figure 3:
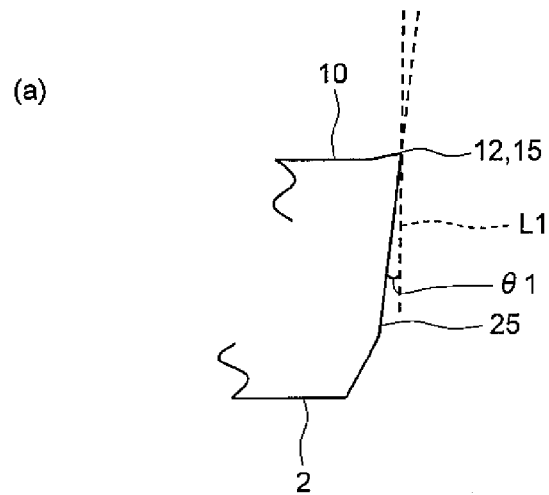
FIG. 3(a) is an enlarged view showing the cross section taken along the line A-A in FIG. 2(a)
FIG. 3(b) is an enlarged view showing the cross section taken along the line B-B in FIG. 2(a)
FIG. 3(c) is an enlarged view showing the cross section taken along the line C-C in FIG. 2(a)
Figure 3:
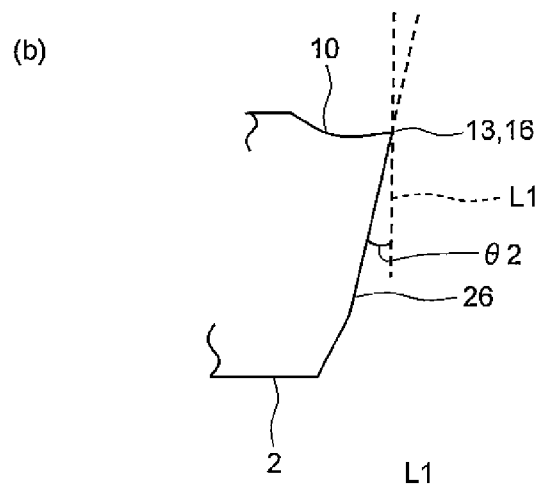
Figure 3:
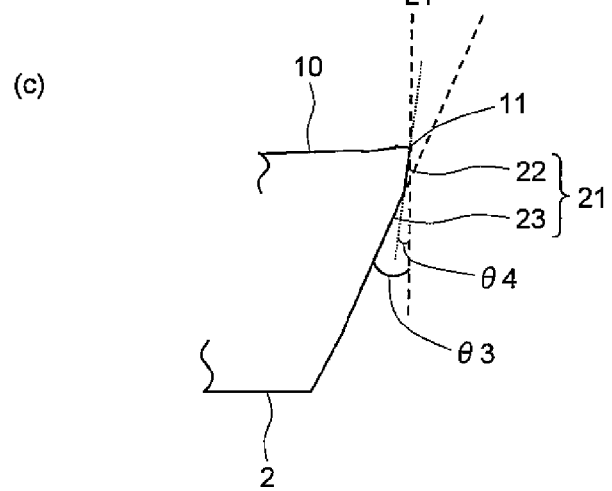

An insert according to an embodiment of the present invention is described below in detail with reference to FIG. 1 to FIG. 3(c). As shown in FIG. 1 to FIG. 2(c), the insert 1 according to the present embodiment includes an upper face 10, a bottom face 2 corresponding to the upper face 10, and a side face 20 located between the upper face 10 and the bottom face 2.

A part of the upper face 10 functions as a rake face through which generated chips graze. The upper face 10 includes a first corner portion 11, and a first side 12 and a second side 13 respectively disposed on both sides of the first corner portion 11.

The upper face 10 has a substantially square shape, specifically substantially rhombus shape when viewed from above as shown in FIG. 2(a). A through-hole 3 is formed in the middle section of the upper face 10. The through-hole 3 is used for screw fastening, and extends from the upper face 10 to the bottom face 2. The insert 1 has a 180-degree rotationally symmetrical shape with the central axis of the through-hole 3 as the rotation axis. Therefore, the upper face 10 has a pair of first corner portions 11 and 11 opposing each other, a pair of first sides 12 and 12 opposing each other, and a pair of second sides 13 and 13 opposing each other.

The paired first corner portions 11 and 11 are located on one diagonal of the upper face 10. The upper face 10 also has a pair of second corner portions 14 and 14 located on the other diagonal of the upper face 10. Among these four corners having a substantially rhombus shape, the first corner portions 11 are located at obtuse angle corners, and the second corner portions 14 are located at acute angle corners, respectively.

The insert 1 has first cutting edges 15 formed along the first sides 12, and second cutting edges 16 formed along the second sides 13, respectively. The first cutting edge 15 and the second cutting edge 16 are disposed adjacent each other through the first corner portion 11.

The side face 20 has a first region 25 corresponding to the first cutting edge 15, a second region 26 corresponding to the second cutting edge 16, and a third region 21 corresponding to the first corner portion 11. Each of the first region 25, the second region 26, and the third region 21 functions as a flank face. The flank face may be the side face of the insert which functions as the flank face with respect to the substantially corresponding cutting edge. That is, the flank face corresponding to the cutting edge is not limited to the side face directly connected to the corresponding cutting edge.

The third region 21 has an upper region 22 which is adjacent to the first corner portion 11 and disposed toward the upper face 10, and a lower region 23 located below the upper region 22. The upper region 22 is connected to the first region 25 and the second region 26, as shown in FIGS. 2(b) and 2(c). That is, the upper region 22 is smoothly connected to the first region 25 and the second region 26. The lower region 23 is formed planely.

As shown in FIG. 3(a), the first region 25 has an inclination angle $\theta 1$ to the bottom face 2. As shown in FIG. 3(b), the second region 26 has an inclination angle $\theta 2$ to the bottom face 2. As shown in FIG. 3(c), the upper region 22 has an inclination angle $\theta 4$ to the bottom face 2. The inclination angle $\theta 4$ is equal to the inclination angle $\theta 1$ at one end located toward the first region 25 and equal to the inclination angle $\theta 2$ at the other end located toward the second region 26. As shown in FIG. 3(c), the lower region 23 has an inclination angle $\theta 3$ to the bottom face 2. In the present embodiment, the inclination angle $\theta 3$ is larger than each of the inclination angle $\theta 1$ and the inclination angle $\theta 2$.

Consequently, the cutting edge strength in the vicinity of the first corner portion 11 can be ensured by the upper region 22 continuous with the first corner portion 11. Additionally, when the insert 1 is attached to the holder as the outer insert, a constraining side face of the insert pocket opposed to one of the first corner portion 11 located on the side not to be involved in cutting in the insert 1 can be located further inside the holder.

Figure 5:
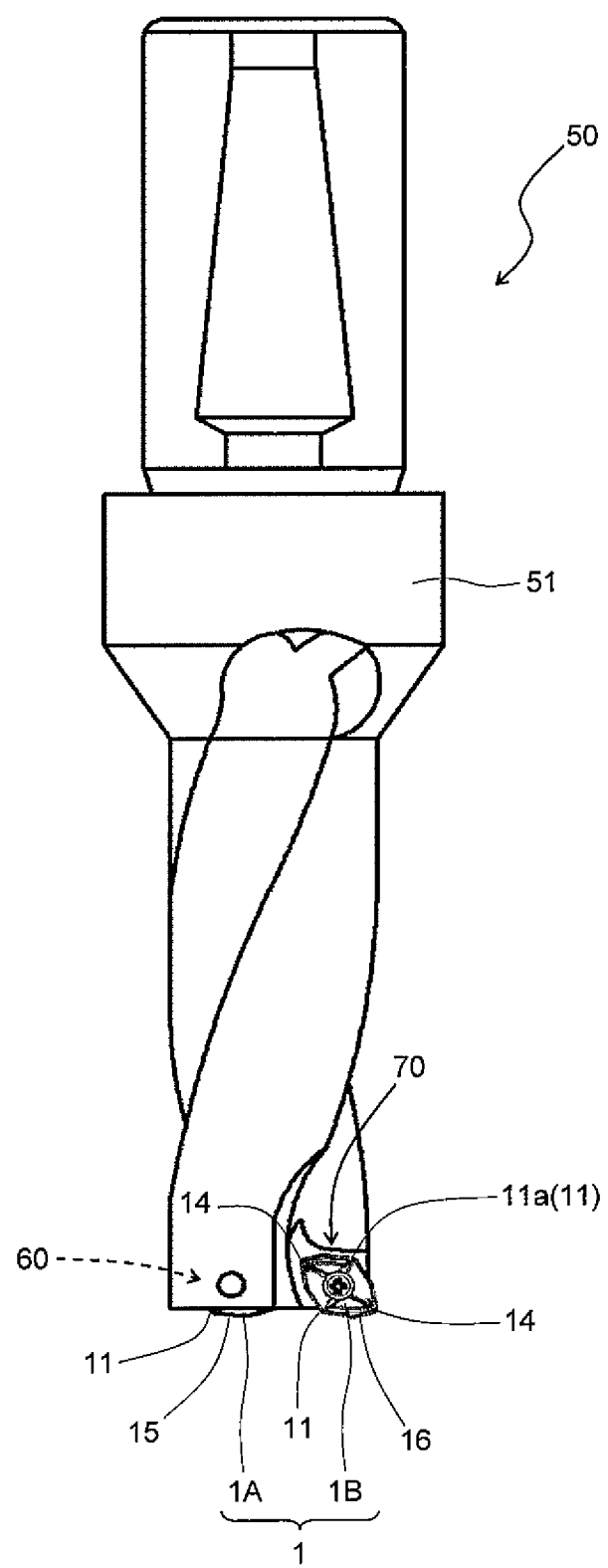
FIG. 5 is a side view showing a drill according to an embodiment of the present invention which is constructed by attaching the cutting insert for the drill shown in FIG. 1 to a holder.

That is, as shown in FIG. 5 described later, the insert 1 is attached to a second insert pocket 70 as the outer insert 1B so that a part of the second cutting edge 16 protrudes from the tip end of the holder 51. Hereat, the first corner portion 11a of the paired first corner portions 11 and 11 which is located on the side not to be involved in the cutting in the insert 1 is disposed toward the outer periphery of the holder 51 in the second insert pocket 70 and disposed on the basal end of the holder 51. As described earlier, the inclination angle $\theta 3$ in the lower region 23 of the first corner portion 11a is large. This ensures a large thickness of an outer wall S2 of the holder 51 which is located toward the outer periphery of the holder 51 in the second insert pocket 70 and located on the basal end of the holder 51, as shown in FIG. 6(b) and FIG. 7 described later. Hence, according to the insert 1, it is capable of improving the cutting edge strength of the insert 1 and the strength of the holder 51 in the outer wall S2. As a result, besides maintaining the high cutting strength, the toughness of the holder 51 is enhanced, thus improving the tool life of the drill 50.

Particularly, in small-diameter throwaway type drills in which the strength of the holder itself is low and the insert occupies a large volume in the holder, the strength of the portions of the holder where the inner peripheral insert pocket and the outer peripheral insert pocket are formed. Therefore, the breakage of the holder can also be satisfactorily reduced in the small-diameter throw away type drills.

During high feed machining, conventional inserts have a tendency that the cutting resistance generated in the cutting edge is increased, and the holder vibration and run-out are liable to occur, and hence the holder is susceptible to irregular distortion. In contrast, the inserts of the present embodiment are capable of suitably reducing the holder breakage due to the insufficient strength of the portion of the holder during the high feed machining.

The inclination angle (clearance angle) can be found as an angle formed between a line L1 substantially vertical to a flat mounting surface on which the insert 1 is placed, and each region. That is, in the cross section substantially vertical to the cutting edge corresponding to each region as shown in FIGS. 3(a) to 3(C), the angle formed between the line L1 substantially vertical to the bottom face 2 and each region can be employed as the inclination angle.

On the other hand, the inclination angle $\theta 2$ is larger than the inclination angle $\theta 1$ ($\theta 2 > \theta 1$). The inclination angle $\theta 4$ increases as it goes from the first region 25 to the second region 26. The inclination angle $\theta 3$ is constant in the direction along the first corner portion 11. Thereby, besides enhancing the cutting edge strength of the first cutting edge 15 subjected to a large cutting load, and reducing the cutting resistance of the second cutting edge 16, the cutting edge strength in the vicinity of the first corner portion 11 can be maintained, and the thickness of the outer wall S2 can be increased owing to the upper region 22.

When viewed from side as shown in FIGS. 2(b) and 2(c), a heightwise dimension H1 of the lower region 23 is larger than a heightwise dimension H2 of the upper region 22 (H1>H2). This increases the area of the lower region 23 inclined at a large inclination angle which corresponds to the area of the constraining side surface of the second insert pocket of the corresponding second insert pocket. Therefore, the constraining side surface of the second insert pocket can be disposed further toward the inner periphery of the holder, thereby still further increasing the thickness of the outer wall S2. As used herein, the heightwise dimensions H1 and H2 mean the maximum value among the dimensions in the direction substantially vertical to the bottom face 2 when the insert 1 is placed on the flat mounting surface.

In the side views shown in FIGS. 2(b) and 2(c), a widthwise dimension W of the lower region 23 increases as it goes from the upper face 10 to the bottom face 2. This increases the area of the lower region 23. Therefore, the thickness of the outer wall S2 can be increased to enhance the strength of the holder.

As used herein, the widthwise dimension W means the maximum value among the dimensions in the direction substantially parallel to the bottom face 2 when the insert 1 is placed on the flat mounting surface.

Although the foregoing insert 1 is constructed to produce the above effect when used as the outer insert 1B, the insert according to the present invention is not limited to those having the shape of the insert 1. That is, when attached to the insert pocket in an embodiment of the insert according to the present invention, the side face corresponding to the corner portion located toward the outer periphery of the holder and located toward the basal end in the insert pocket has the construction as described above.

Therefore, the insert according to other embodiment of the present invention can also be adapted to produce the above effect if attached to the holder as either one of the inner insert and the outer insert. That is, as shown in FIG. 5, the insert according to other embodiment of the present invention can also be adapted so that, when attached to the first insert pocket 60 and the second insert pocket 70 as the inner insert 1A and the outer insert 1B, respectively, the side face which is located toward the outer periphery of the holder 51 in the insert pocket and also located toward the basal end of the holder 51, and which corresponds to the corner portion located on the side not to be involved in the cutting has the above construction.

Figure 4:
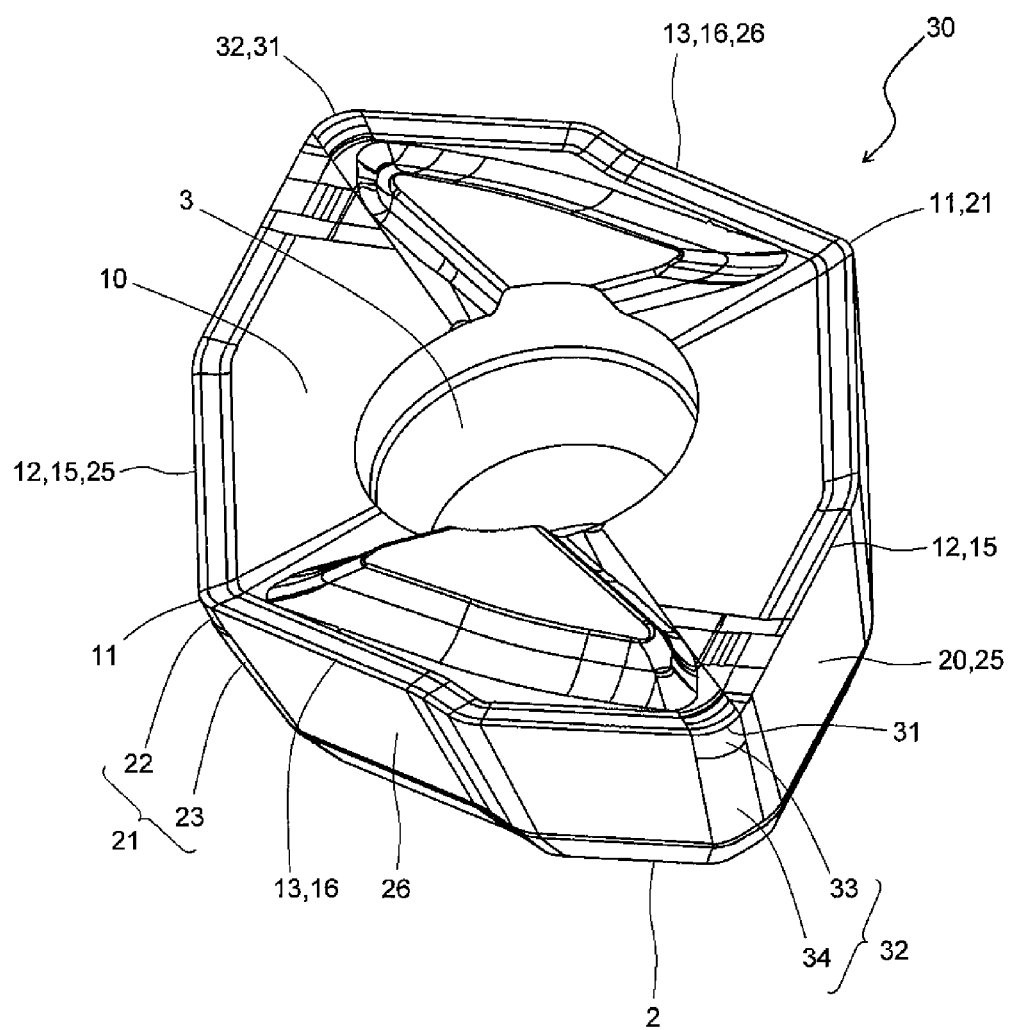
FIG. 4 is an entire perspective view showing a cutting insert for a drill according to other embodiment of the present invention.

The insert according to other embodiment of the present invention is described below in detail with reference to FIG. 4. In FIG. 4, similar reference numerals are used to denote the components similar to those in FIGS. 1 to 3(c) described above, and the descriptions thereof are omitted. As shown in FIG. 4, in the insert 30 according to the present invention, a first cutting edge 15 is formed adjacent to two second cutting edges 16 and 16, and one end thereof is connected to a first corner portion 11 and the other end thereof is connected to a second corner portion 31. Similarly, one end of the second cutting edges 16 is connected to the first corner portion 11, and the other is connected to the second corner portion 31.

A side face 20 further has a fourth region 32 corresponding to the second corner portion 31. The fourth region 32 has an upper region 33 which is adjacent to the second corner portion 31 and disposed toward an upper face 10, and a lower region 34 located below the upper region 33. An inclination angle θ5 (not shown) of the lower region 34 to a bottom face 2 is larger than each of the inclination angle θ1 and the inclination angle θ2. That is, in the insert 30, both of the inclination angle θ3 and the inclination angle θ5 are larger than each of the inclination angle θ1 and the inclination angle θ2.

Figure 6:
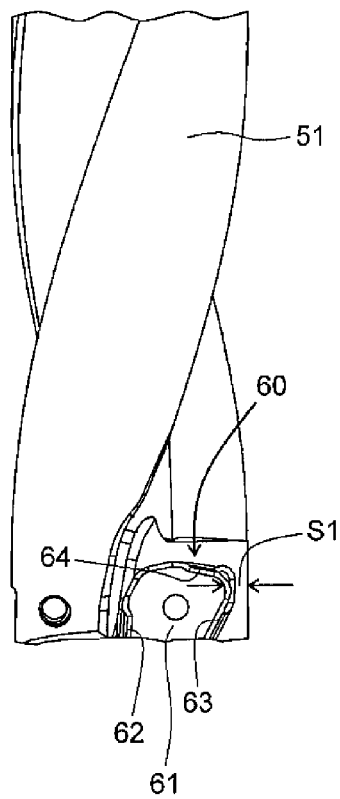
FIG. 6 (a) is an enlarged side view showing the neighborhood of a first insert pocket of the holder shown in FIG. 5.
Figure 6:
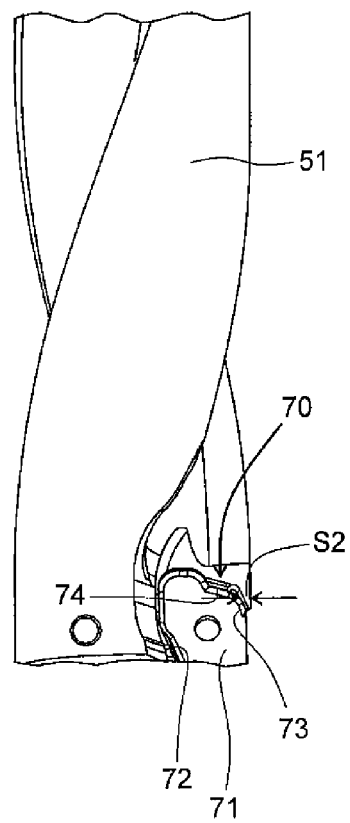
Figure 7:
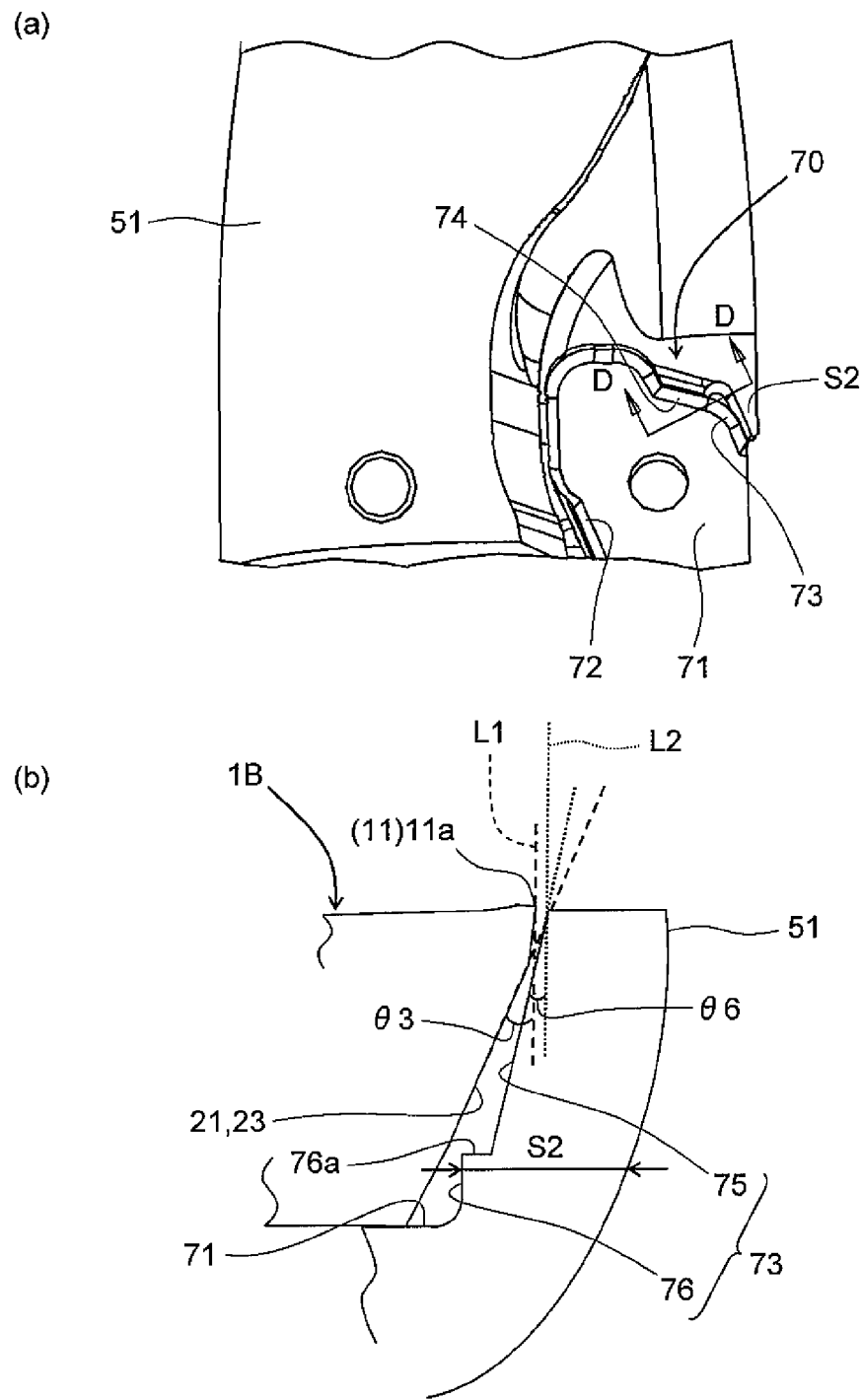
FIG. 7(a) is an enlarged side view showing the second insert pocket shown in FIG. 6(b)
FIG. 7(b) is a schematic explanatory drawing showing a state in which the insert is attached to an enlarged view showing the cross section taken along the line D-D in FIG. 7(a)

Thereby, when the insert 30 is applied to both of the inner insert 1A and the outer insert 1B, as shown in FIG. 6, it is capable of ensuring large thicknesses of outer walls S1 and S2 of the holder which are located toward the outer periphery of the holder 51 in their respective corresponding insert pockets. Hence, according to the insert 30, the strengths of portions of the holder 51 where first and second insert pockets 60 and 70 are formed can be enhanced, thus enhancing the effect of reducing breakage of the holder 51.

In the case of having a substantially rhombus shape when viewed from above as in the insert 30, as shown in FIG. 6(a), it is unavoidable that an outer wall S1 of the holder 51 located toward the outer periphery of the holder 51 in the first insert pocket becomes small particularly on the basal end of the holder 51 opposed to the corner portion located on the side not to be involved in the cutting.

However, the insert 30 ensures the large thickness of the basal end of the outer wall S1 as described above. Even in the insert whose upper view has the substantially rhombus shape, the strength of the basal end of the outer wall S1 can be enhanced, thereby reducing breakage of the holder during machining. Other constructions are similar to those in the insert 1 according to the foregoing embodiment.

<Drill>

A drill according to one embodiment of the present invention is described below in detail with reference of FIGS. 5 to 7 by taking, for example, the case of attaching the insert 1 thereto. As shown in FIG. 5, the drill 50 according to the present embodiment is constructed by attaching two inserts 1 to the tip end of the holder 51.

That is, the drill 50 includes an inner insert 1A attached to the inner side of the tip end of the holder 51, and an outer insert 1B attached to the outer side thereof. A first insert pocket 60 (inner peripheral insert pocket) and a second insert pocket 70 (outer peripheral insert pocket) are respectively formed at the tip end of the holder 51.

As shown in FIG. 6(a), the first insert pocket 60 is formed toward the inner periphery of the tip end of the holder 51. As shown in FIG. 6(b), the second insert pocket 70 is formed at the tip end of the holder 51 and toward the outer periphery of the holder 51 than the first insert pocket 60.

The inner insert 1A is attached to the first insert pocket 60 so that at least a part of the first cutting edge 15 protrudes from the tip end of the holder 51. Hereat, the inner insert 1A is attached so that the first corner portion 11 is located toward the outer periphery of the holder 51 at the tip end of the holder 51.

The outer insert 1B is attached to the second insert pocket 70 so that at least a part of the second cutting edge 16 protrudes from the tip end of the holder 51. Hereat, the outer insert 1B is attached so that the first corner portion 11 is located toward the inner periphery of the holder 51, and the second corner portion 14 is located toward the outer periphery of the holder 51 at the tip end of the holder 51.

In the drill 50, the first cutting edge 15 of the inner insert 1A functions as the inner cutting edge for cutting the inner side of the bottom face of a hole, and the second cutting edge 16 of the outer insert 1B functions as the outer cutting edge for cutting the outer side of the bottom face of the hole.

The first corner portion 11a of the paired first corner portions 11 and 11 of the outer insert 1B which is located on the side not to be involved in the cutting is disposed toward the outer periphery of the holder 51 in the second insert pocket 70 and disposed on the basal end side of the holder 51.

As described earlier, in the insert 1 as the outer insert 1B, the inclination angle θ3 in the lower region 23 below the first corner portion 11a is larger than each of the inclination angle θ1 and the inclination angle θ2. It is therefore capable of ensuring a large thickness of the outer wall S2 of the holder 51 located toward the outer periphery of the holder 51 in the second insert pocket 70 and located toward the basal end of the holder 51, as shown in FIG. 6(b). This achieves the holder 51 in which the outer wall S2 has high strength, thereby improving the lifetime of the holder. Consequently, the drill 50 is capable of reducing the breakage of the holder caused due to insufficient strength of the outer wall during machining as has been conventional, thereby exhibiting excellent cutting performance over a long period of time.

On the other hand, the first insert pocket 60 and the second insert pocket 70 have constraining seat faces 61 and 71, first constraining side faces 62 and 72, second constraining side faces 63 and 73, and third constraining side faces 64 and 74, respectively, as shown in FIGS. 6(a) and 6(b). These first constraining side faces 62 and 72 are located toward the inner periphery of the holder 51, and these second constraining side faces 63 and 73 are located toward the outer periphery of the holder 51. These third constraining side faces 64 and 74 are located toward the basal end of the holder 51 between these first constraining side faces 62 and 72 and these constraining second constraining side faces 63 and 73. These constraining seat faces 61 and 71 contact against the bottom face 2 of the insert 1. The first and third constraining side faces 62, 64, 72 and 74 contact against the side face 20 of the insert 1.

These first constraining side faces 62 and 72, and these second constraining side faces 63 and 73 of the first insert pocket 60 and the second insert pocket 70 have different arrangements so as to correspond to the shapes of the inner insert 1A and the outer insert 1B to be attached, respectively. Specifically, as shown in FIG. 6(a), the first constraining side face 62 and the second constraining side face 63 of the first insert pocket 60 are disposed incliningly away from the outer peripheral face of the holder 51 constituting the outer wall S1 as they go from the basal end to the tip end of the holder 51.

On the other hand, as shown in FIG. 6(b), the second constraining side face 72 and the second constraining side face 73 of the second insert pocket 70 are disposed incliningly away from the outer peripheral face of the holder 51 into which the second insert pocket 70 opens, as they go from the tip end to the basal end of the holder 51.

Here, as shown in FIGS. 7(a) and 7(b), the second insert pocket 70 is formed so that a lower part 76 of the second constraining side face 73 protrudes inward of the holder 51. More specifically, an upper part 75 of the second constraining side face 73 is formed incliningly away from the outer peripheral face of the holder 51 as it goes toward the constraining seat face 71, and a lower part 76 is formed protrudingly inward of the holder 51 so as to form a step from the upper part 75.

This further improves the strength of the part of the outer wall S2 (the lower part 76) located toward the constraining seat face 71 susceptible to breakage due to stress concentration, thereby further enhancing the effect of reducing the breakage of the part of the outer wall S2 which is located toward the basal end of the holder 51 during machining. FIG. 7(b) is the sectional view vertical to the constraining seat face 71 of the second insert pocket 70.

Additionally, the outer insert 1B is attached to the second insert pocket 70 so that the third region 21, more specifically the lower region 23 corresponding to the first corner portion 11a located on the side not to be involved in the cutting is opposed to the lower part 76. Thereby, the strength of the outer wall S2 can be efficiently improved.

Although the lower part 76 is formed to have the step portion including an upper face 76a substantially parallel to the constraining seat face 71, the construction of the lower part is not limited thereto. The lower part may be formed planely as long as it protrudes inward of the holder 51.

As shown in FIG. 7(b), in the second insert pocket 70, an inclination angle θ6 of the second constraining side face 73 to the constraining seat face 71 is smaller than the inclination angle θ3 corresponding to the first corner portion 11a opposed to the second constraining side face 73 and located on the side not to be involved in the cutting (θ6<θ3). This increases the thickness of the outer wall S2, thereby ensuring the strength of the holder 51 and reducing the interference between the lower region 23 of the outer insert 1B and the second constraining side face 73. Consequently, the lifetime of the entire drill can be improved to achieve stable cutting (machining) over a long period of time. The inclination angle θ6 can be obtained as an angle formed between a line L2 substantially vertical to the constraining seat face 71 and the second constraining side face 73 in the cross section substantially vertical to the constraining seat face 71.

Although the present embodiment has described the case where the second insert pocket 70 has the foregoing construction, the drill and the holder according to the present invention are not limited to the present embodiment. For example, the drill may be constructed by including the holder in which, similarly to the second insert pocket 70, the first insert pocket 60 also has the foregoing construction. Alternatively, the holder may be one in which only the first insert pocket 60 has the foregoing construction.

<Method of Cutting Work Material>

Figure 8:
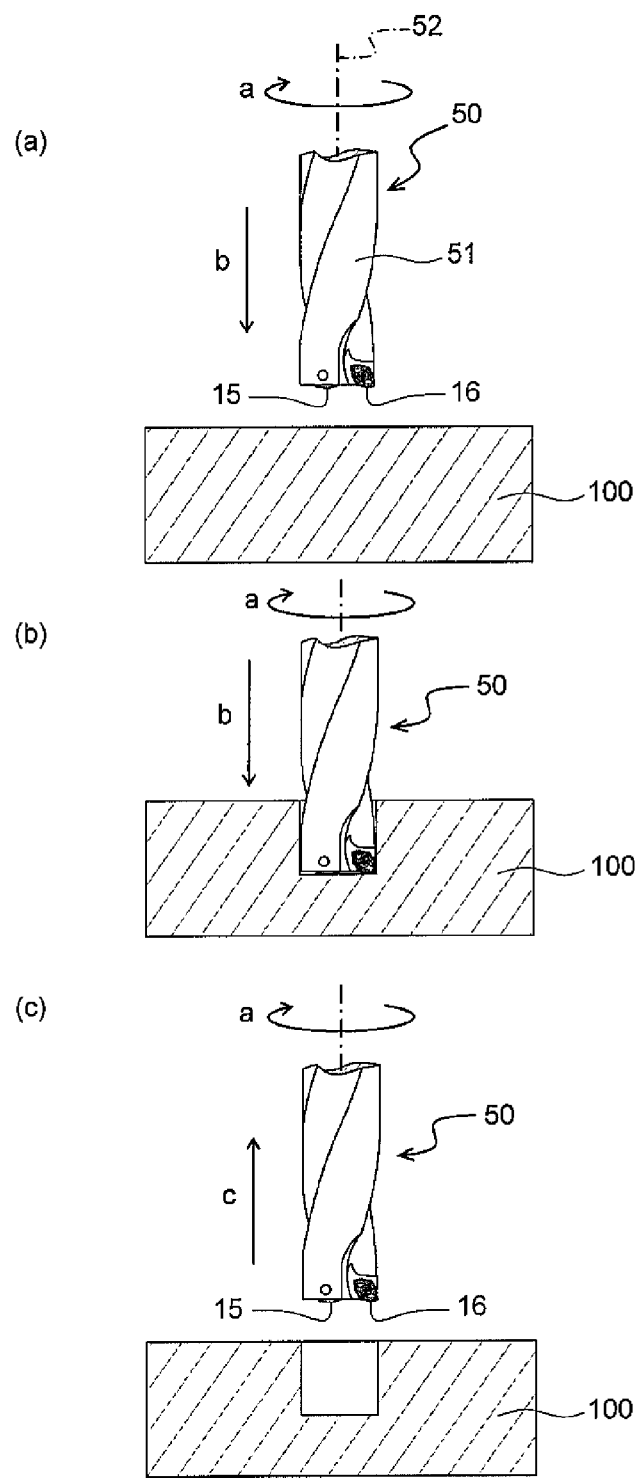
FIGS. 8(a) to 8(c) are schematic explanatory drawings showing a method of cutting a work material according to an embodiment of the present invention.

Next, an embodiment according to the method of cutting a work material according to the present invention is described in detail with reference of FIGS. 8(a) to 8(c) by taking, for example, the case of using the drill 50. The method of cutting the work material according to the present embodiment includes the following steps (i) to (iv):

(i) the step of rotating the drill 50 around the central axis 52 of the holder 51 in the direction indicated by the arrow "a" as shown in FIG. 8(a);

(ii) the step of bringing the first cutting edge 15 and the second cutting edge 16 of the drill 50 near the work material 100 by moving the drill 50 in the direction indicated by the arrow "b" as shown in FIG. 8(a);

(iii) the step of cutting (hole-drilling) the work material 100 by further moving the drill 50 in the direction indicated by the arrow "b" as shown in FIG. 8(b) to bring the first cutting edge 15 and the second cutting edge 16 of the drill 50 into contact with the surface of the work material 100; and (iv) the step of separating the first cutting edge 15 and the second cutting edge 16 from the work material 100 by moving the drill 50 in the direction indicated by the arrow "c" as shown in FIG. 8(c).

In the present embodiment, the cutting is carried out using the drill 50 which is capable of reducing the breakage of the holder 51 during the cutting and has a long tool life, so that the cutting (machining) with excellent machining accuracy can be stably achieved over a long period of time.

In the step (i), either one of the drill 50 and the work material 100 may be rotated. In the step (ii), the individual cutting edges 15 and 16 and the work material 100 may be relatively brought near. For example, the work material 100 may be brought near the individual cutting edges 15 and 16. Similarly, in the step (iv), the work material 100 and the individual cutting edges 15 and 16 may be relatively separated. For example, the work material 100 may be separated from the individual cutting edges 15 and 16. When the cutting (machining) is continued, the step of bringing the individual cutting edges 15 and 16 of the drill 50 into contact with different points of the work material 100 may be repeated, keeping the state in which either one of the drill 50 and the work material 100 is rotated. When the cutting edge in use is worn, the unused cutting edge may be used by rotating the insert 1 180 degrees with respect to the central axis of the through hole 3.

While the several preferred embodiments of the present invention have been described and illustrated above, the present invention is not limited to the foregoing embodiments. It is needless to say that the present invention can optionally be embodied as long as it does not depart from the aim of the present invention. For example, the present invention may be the insert in which, when attached to the first insert pocket as the inner insert, the side face corresponding to the corner portion located toward the outer periphery of the holder in the first insert pocket and disposed toward the basal end of the holder and located on the side not to be involved in the cutting may have the foregoing construction.

Although the lower region 23 is formed planely in the foregoing embodiment, the lower region may be formed in a curved surface shape.

The invention claimed is:

1. A cutting insert for a drill, comprising:
an upper face comprising a first corner portion, and a first side and a second side respectively disposed on both sides of the first corner portion;
a bottom face corresponding to the upper face;
a side face located between the upper face and the bottom face;
a first cutting edge formed along the first side; and
a second cutting edge formed along the second side, wherein
the side face comprises a first region which is connected to the first cutting edge, a second region which is connected to the second cutting edge, and a third region corresponding to the first corner portion,
the third region comprises an upper region which is adjacent to the first corner portion and is disposed toward the upper face, and a lower region located below the upper region and connected to the upper region, and
an inclination angle $\theta 3$ of the lower region to the bottom face is larger than each of an inclination angle $\theta 1$ of the first region to the bottom face and an inclination angle $\theta 2$ of the second region to the bottom face,
the inclination angle $\theta 2$ is larger than the inclination angle $\theta 1$,
an inclination angle $\theta 4$ of the upper region to the bottom face increases as it goes from the first region to the second region, and
the inclination angle $\theta 3$ is constant in a direction along the first corner portion.

2. The cutting insert for a drill according to claim 1, wherein a heightwise dimension of the lower region is larger than a heightwise dimension of the upper region when viewed from side.

3. The cutting insert for a drill according to claim 2, wherein a widthwise dimension of the lower region increases as it goes from the upper face to the bottom face when viewed from side.

4. The cutting insert for a drill according to claim 1, wherein
the upper face with a substantially square shape when viewed from above comprises a pair of the first corner portions opposing each other, a pair of the first sides opposing each other, and a pair of the second sides opposing each other, the pair of first corner portions being located on one diagonal of the upper face, and
the upper face further comprises a pair of second corner portions located on the other diagonal of the upper face.

5. The cutting insert for a drill according to claim 4, wherein
the side face further comprises a fourth region corresponding to the pair of second corner portions,
the fourth region comprises an upper region which is adjacent to the pair of second corner portions and is disposed toward the upper face, and a lower region located below the upper region, and
an inclination angle $\theta 5$ of the lower region in the fourth region to the bottom face is larger than each of the inclination angle $\theta 1$ and the inclination angle $\theta 2$.

6. A drill, comprising:
a holder comprising a first insert pocket formed at a tip end portion thereof, and a second insert pocket which is formed at the tip end portion thereof and is closer to an outer periphery thereof than the first insert pocket; and
a pair of cutting inserts for a drill according to claim 1, each comprising at least two of the first corner portions, wherein
one of the pair of cutting inserts for the drill is attached to the first insert pocket so that at least a part of the first cutting edge protrudes from a tip end of the holder,
the other of the pair of cutting inserts for the drill is attached to the second insert pocket so that at least a part of the second cutting edge protrudes from the tip end of the holder, and
at least one of the pair of the cutting inserts for the drill is attached to one of the first and second insert pockets so that one of the at least two of the first corner portions being located on a side not to be involved in cutting is disposed closer to the outer periphery and a basal end of the holder in the one of the first and second insert pockets with the at least one of the pair of the cutting inserts for the drill attached thereto.

7. The drill according to claim 6, wherein
each of the first insert pocket and the second insert pocket comprises a constraining seat face contacting against the bottom face of each of the pair of the cutting inserts for the drill, and a constraining side face being located toward the outer periphery of the holder and corresponding to the side face of each of the pair of the cutting inserts for the drill, and
at least one of the first insert pocket and the second insert pocket is formed so that a lower part of the constraining side face protrudes inwardly of the holder.

8. The drill according to claim 7, wherein each of the pair of the cutting inserts for the drill is attached to each of the first and second insert pockets so that the third region corresponding to the one of the at least two of the first corner portions being located on the side not to be involved in the cutting is opposed to the lower part of the constraining side face.

9. The drill according to claim 6, wherein in at least one of the first insert pocket and the second insert pocket, an inclination angle $\theta 6$ of the constraining side face to the constraining seat face is smaller than the inclination angle $\theta 3$ corresponding to the one of the at least two of the first corner portions which is opposed to the constraining side face and is located on the side not to be involved in the cutting.

10. A method of cutting a work material, comprising:
providing a drill according to claim 6, comprising a pair of cutting inserts according to claim 1;
rotating either one of the drill and a work material;
bringing the first cutting edge and the second cutting edge of the inserts closer to the work material;
cutting the work material by bringing the first cutting edge and the second cutting edge of the inserts into contact with a surface of the work material; and
separating the first cutting edge and the second cutting edge from the work material.

* * * * *